United States Patent
Yoshida et al.

(10) Patent No.: US 10,502,270 B2
(45) Date of Patent: Dec. 10, 2019

(54) VEHICULAR POWER TRANSMITTING SYSTEM

(71) Applicant: TOYOTA JIDOSHA KABUSHIKI KAISHA, Toyota-shi, Aichi (JP)

(72) Inventors: Michio Yoshida, Susono (JP); Hirofumi Nakada, Toyota (JP); Kazunori Saito, Asahikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 15/904,920

(22) Filed: Feb. 26, 2018

(65) Prior Publication Data

US 2018/0245641 A1    Aug. 30, 2018

(30) Foreign Application Priority Data

Feb. 26, 2017    (JP) ................. 2017-034222

(51) Int. Cl.
*F16H 23/06* (2006.01)
*F16D 23/06* (2006.01)
*F16H 57/04* (2010.01)
*F16H 63/30* (2006.01)
(Continued)

(52) U.S. Cl.
CPC ............ *F16D 23/06* (2013.01); *F16D 25/086* (2013.01); *F16D 25/123* (2013.01); *F16H 57/0478* (2013.01); *F16H 63/3023* (2013.01); *F16D 2023/0631* (2013.01);
(Continued)

(58) Field of Classification Search
CPC ............. F16D 23/06; F16D 2023/0631; F16D 2023/0693; F16D 25/06; F16D 25/086; F16D 25/123
See application file for complete search history.

(56) References Cited

U.S. PATENT DOCUMENTS 7,198,143 B2 * 4/2007 Legner .................... F16D 23/06
                                                     192/53.34
9,512,888 B2 * 12/2016 Downs ................... F16D 29/005
9,523,396 B2 * 12/2016 Wooden ................. F16D 11/14
(Continued)

FOREIGN PATENT DOCUMENTS

CN          105526278 A     4/2016
CN          106051141 A    10/2016
(Continued)

*Primary Examiner* — David R Morris
(74) *Attorney, Agent, or Firm* — Oliff PLC

(57) ABSTRACT

A power transmitting system including: a first piston disposed within a center bore formed through the rotary shaft such that the first piston is axially reciprocable; a sleeve connected to the first piston and having internal teeth meshing with the external teeth of the rotary shaft so that the sleeve is rotated with the rotary shaft, and such that the sleeve is axially reciprocable together with the first piston according to axial movements of the first piston; a synchronizer ring supported in sliding contact with an outer circumferential tapered surface of the clutch gear such that the synchronizer ring is rotatable relative to the clutch gear; and an actuator including a second piston to axially advance the first piston for thereby bringing the sleeve's internal teeth into meshing engagement with the clutch gear through the synchronizer ring. The first piston and second piston are disposed coaxially with the rotary shaft.

14 Claims, 4 Drawing Sheets

(51) Int. Cl.
  *F16D 25/08*  (2006.01)
  *F16D 25/12*  (2006.01)
(52) U.S. Cl.
  CPC .. *F16D 2023/0693* (2013.01); *F16D 2300/06*
    (2013.01); *F16H 2063/3093* (2013.01)

(56) References Cited

U.S. PATENT DOCUMENTS

| | | | |
|---|---|---|---|
| 9,689,491 B2* | 6/2017 | Ito | F16H 9/18 |
| 9,695,884 B2* | 7/2017 | Grogg | F16D 23/06 |
| 9,890,819 B2* | 2/2018 | DeGowske | F16D 11/10 |
| 10,012,297 B2* | 7/2018 | Fukao | B60K 17/00 |
| 10,060,528 B2* | 8/2018 | Novak | F16H 61/30 |
| 2006/0049018 A1 | 3/2006 | Legner | |
| 2015/0167750 A1* | 6/2015 | Grogg | F16D 23/06 |
| | | | 192/53.1 |
| 2016/0108972 A1 | 4/2016 | Downs et al. | |
| 2016/0160938 A1 | 6/2016 | Wooden | |
| 2016/0169381 A1 | 6/2016 | Novak | |
| 2016/0230816 A1 | 8/2016 | DeGowske et al. | |
| 2016/0258531 A1 | 9/2016 | Ito et al. | |
| 2016/0305522 A1 | 10/2016 | Fukao et al. | |
| 2017/0343101 A1* | 11/2017 | Yamamoto | F16H 57/0471 |

FOREIGN PATENT DOCUMENTS

| | | |
|---|---|---|
| JP | 2005-535841 A | 11/2005 |
| JP | 2014-98400 A | 5/2014 |
| JP | 2016-001029 A | 1/2016 |
| JP | 2016-161084 A | 9/2016 |

\* cited by examiner

VEHICULAR POWER TRANSMITTING SYSTEM

CROSS REFERENCE TO RELATED APPLICATION

The present application claims the priority from Japanese Patent Application No. 2017-034222 filed on Feb. 26, 2017, the disclosure of which is herein incorporated by reference in its entirety.

FIELD OF THE INVENTION

The present invention relates in general to a vehicular power transmitting system, more particularly to a vehicular power transmitting system provided with a dog clutch having a synchro-mesh mechanism.

BACKGROUND OF THE INVENTION

There is known a vehicular power transmitting system including a dog clutch which has a synchro-mesh mechanism and which is configured to selectively connect and disconnect a rotary shaft having external teeth and rotatable about its axis, and a clutch gear rotatable relative to the rotary shaft, to and from each other. JP-2016-001029A discloses an example of such a vehicular power transmitting system.

SUMMARY OF THE INVENTION

The dog clutch having the synchro-mesh mechanism disclosed in JP-2016-001029A includes a sleeve, a shift fork, a fork shaft (shift rail) to which the shift fork is fixed, and an actuator for operating the fork shaft to apply a thrust force to the sleeve through the shift fork, for moving the sleeve in an axial direction to bring the dog clutch into its engaged state. The sleeve is reciprocated with the thrust force, in the axial direction of the rotary shaft, so that the dog clutch having the synchro-mesh mechanism is switched between its engaged and released states. In the dog clutch of JP-2016-001029A, however, the fork shaft is disposed radially outwardly of the rotary shaft, and the thrust force acts on the sleeve through the shift fork which is fixed to the fork shaft in a cantilever fashion, for example, so that the fork shaft is subjected to bending or deflection due to the thrust force, and a piston provided at an axial end of the fork shaft is subjected to a force in an inadequate direction, giving rise to a risk of deterioration of an intended sealing function of an oil seal fitted on the piston, and consequent instability of performance of the sealing function of the oil seal.

The present invention was made in view of the background art described above. It is therefore an object of the present invention to provide a vehicular power transmitting system wherein a piston to move a sleeve for switching a dog clutch having a synchro-mesh mechanism, between its engaged and released states, has a high degree of operating stability.

The object indicated above is achieved according to any one of the following modes of the invention:

According to a first mode of the invention, there is provided a vehicular power transmitting system including a dog clutch having a synchro-mesh mechanism, which dog clutch is provided to selectively connect and disconnect a rotary shaft having external teeth and rotatable about its axis, and a clutch gear rotatable relative to the rotary shaft, to and from each other, the clutch gear having a tapered outer circumferential surface. The vehicular power transmitting system comprises: a first piston disposed within a center bore formed through the rotary shaft such that the first piston is axially reciprocable; a sleeve connected to the first piston and having internal teeth meshing with the external teeth of the rotary shaft so that the sleeve is rotated with the rotary shaft, and such that the sleeve is axially reciprocable together with the first piston according to axial movements of the first piston; a synchronizer ring supported in sliding contact with the tapered outer circumferential surface of the clutch gear such that the synchronizer ring is rotatable relative to the clutch gear; and an actuator including a second piston to axially reciprocate the first piston for thereby bringing the internal teeth of the sleeve into meshing engagement with the clutch gear through the synchronizer ring. The first piston and the second piston are disposed coaxially with the rotary shaft.

According to a second mode of the invention, the vehicular power transmitting system according to the first mode of the invention further comprises an elastic member disposed between an outer circumferential surface of the first piston and an inner circumferential surface of the rotary shaft to bias the first piston in a direction for disengagement of the internal teeth of the sleeve from the clutch gear.

According to a third mode of the invention, the vehicular power transmitting system according to the second mode of the invention is configured such that the elastic member is a coil spring disposed coaxially with the first piston.

According to a fourth mode of the invention, the vehicular power transmitting system according to the second or third mode of the invention is configured such that the first piston is axially retracted in a direction away from the clutch gear with a biasing force of the elastic member while the first piston is not axially advanced by the second piston.

According to a fifth mode of the invention, the vehicular power transmitting system according to any one of the first through fourth modes of the invention is configured such that the rotary shaft is supported by a pair of support walls via a pair of bearings, and the second piston is at least partly accommodated within one of the pair of support walls.

According to a sixth mode of the invention, the vehicular power transmitting system according to the fifth mode of the invention is configured such that the actuator is a hydraulic actuator having a piston fitting hole which is formed in the above-described one of the pair of support walls coaxially with the second piston and in which the second piston is slidably and oil-tightly fitted, and the second piston and the piston fitting hole cooperate to define an oil chamber.

According to a seventh mode of the invention, the vehicular power transmitting system according to the sixth mode of the invention is configured such that the oil chamber is a cylindrical space formed coaxially with the rotary shaft.

According to an eighth mode of the invention, the vehicular power transmitting system according to any one of the first through seventh modes of the invention is configured such that a damper member is interposed between the first and second pistons, and the first piston is held in abutting contact with the second piston via the damper member such that the first piston is rotatable relative to the second piston.

According to a ninth mode of the invention, the vehicular power transmitting system according to the eighth mode of the invention is configured such that the damper member is bonded to an axial end face of the second piston on the side of the first piston.

According to a tenth mode of the invention, the vehicular power transmitting system according to the sixth or seventh mode of the invention is configured such that the hydraulic actuator includes a mechanically operated hydraulic pump or an electrically operated hydraulic pump to pressurize a working fluid in the oil chamber), for thereby axially moving the second piston in a direction toward the first piston.

According to an eleventh mode of the invention, the vehicular power transmitting system according to any one of the fifth through seventh modes of the invention is configured such that the rotary shaft has a center bore in which the first piston and an axial end portion of the second piston are accommodated, and a lubricant is supplied into the center bore through one of opposite axial open ends of the center bore which is on the side of the other of the pair of support walls, the clutch gear being mounted on the rotary shaft via a needle bearing such that the clutch gear is rotatable relative to the rotary shaft, the rotary shaft having at least one radial oil passage formed so as to extend therethrough in its radial direction, so that the lubricant is delivered from the center bore to the needle bearing through the at least one radial oil passage.

According to a twelfth mode of the invention, the vehicular power transmitting system according to the eleventh mode of the invention is configured such that the rotary shaft has a guide hole extending in its axial direction, for fluid-communication with the center bore, and the sleeve is connected to the first piston through a connecting member which extends through the guide hole and which is fixed to the first piston.

According to a thirteenth mode of the invention, the vehicular power transmitting system according to any one of the first through twelfth modes of the invention is configured such that the first piston is located in an axially middle portion of the rotary shaft.

According to a fourteenth mode of the invention, the vehicular power transmitting system according to any one of the first through twelfth modes of the invention is configured such that the first piston is located in an axial end portion of the rotary shaft which is on the side of the second piston.

Advantages of the Invention

According to the first mode of the invention, the vehicular power transmitting system comprises the first piston disposed within the rotary shaft in the form of the rotary, and the sleeve connected to the first piston and reciprocable together with the first piston in a direction of an axis of the rotary shaft, according to axial movements of the first piston. The sleeve has internal teeth meshing with external teeth of the rotary shaft so that the sleeve is rotated with the rotary shaft. The vehicular power transmitting system further comprises the synchronizer ring supported in sliding contact with the tapered outer circumferential surface of the clutch gear such that the synchronizer ring is rotatable relative to the clutch gear, and the hydraulic actuator including the second piston to axially advance the first piston for thereby bringing the internal teeth of the sleeve into meshing engagement with the clutch gear through the synchronizer ring. Further, the first piston and the second piston are disposed coaxially with the rotary shaft. Thus, the dog clutch is switched from the released state to the engaged state with an axial movement of the sleeve with a thrust force which is applied to the first piston disposed within and coaxially with the rotary shaft, by an axial movement of the second piston also disposed coaxially with the rotary shaft. Namely, the thrust force is applied to the rotary shaft through the first and second pistons disposed coaxially with the rotary shaft. Accordingly, the first piston coaxial with the rotary shaft is less likely to be subjected to a bending force than where the first piston receives the thrust force at a point not on the axis of the rotary shaft, for example, at a point spaced apart from the axis in the radial direction of the rotary shaft. Therefore, the first piston is not required to be provided with an oil sealing member, and is operable with a high degree of stability, so that the dog clutch has an increased degree of operational reliability.

According to the second mode of the invention, the vehicular power transmitting system further comprises the elastic member in the form of the coil spring disposed in the space between the outer circumferential surface of the first piston and the inner circumferential surface of the rotary shaft to bias the first piston in the axial direction for disengagement of the internal teeth of the sleeve from the clutch gear. Accordingly, the first piston can be moved in the axial direction for disengagement of the internal teeth of the sleeve from the clutch gear with the biasing force of the elastic member.

According to the third mode of the invention, the elastic member is a coil spring disposed coaxially with the first piston. Accordingly, the first piston can be efficiently moved with the biasing force of the coil spring in the direction for disengagement of the internal teeth of the sleeve from the clutch gear.

According to the fourth mode of the invention, the first piston is axially retracted in the direction away from the clutch gear with the biasing force of the coil spring while the first piston is not axially advanced by the second piston. Since the first piston can be retracted in the direction away from the clutch gear with the biasing force of the coil spring, the vehicular power transmitting system need not be configured to apply a hydraulic pressure of a pressurized working fluid to the first piston to retract the first piston in the direction away from the clutch gear. Accordingly, the vehicular power transmitting system is not required to be provided with a solenoid-operated valve for applying the hydraulic pressure of the pressurized working fluid to the first piston, so that the number of components of the vehicular power transmitting system can be reduced, with a result of reduction of its cost of manufacture.

According to the fifth mode of the invention, the rotary shaft is supported by the pair of support walls via the pair of bearings, and the second piston is at least partly accommodated within one of the pair of support walls. Since the second piston for axially advancing the first piston is at least partly accommodated within the support wall separate from the rotary shaft, the rotary shaft need not be provided with an accurately formed portion for accommodating the second piston, and a sealing member having a high degree of sealing function. Accordingly, the cost of manufacture of the rotary shaft can be reduced.

According to the sixth mode of the invention, the actuator is the hydraulic actuator having the piston fitting hole which is formed in the above-described one of the pair of support walls coaxially with the second piston and in which the second piston is slidably and oil-tightly fitted, and the second piston and the piston fitting hole cooperate to define the oil chamber. When the dog clutch is brought into its engaged state, the pressurized working fluid is fed into the oil chamber to axially move the second piston for axially advancing the first piston to which the sleeve is connected. Accordingly, it is not necessary to apply the hydraulic pressure of the pressurized working fluid directly to the first piston, whereby it is not necessary to provide the first piston with an oil sealing member, and not necessary to form an oil passage through which the pressurized working fluid is fed to axially advance the first piston. Accordingly, the cost of manufacture of the vehicular power transmitting system can be reduced.

According to the seventh mode of the invention, the oil chamber is the cylindrical space formed coaxially with the rotary shaft. Since the oil chamber is formed as the cylindrical space coaxial with the rotary shaft, that is, coaxially with the first and second pistons, a loss of hydraulic pressure of the pressurized working fluid to be fed into the oil chamber can be made smaller than where the oil chamber was not coaxial with the first and second pistons. Accordingly, the second piston can be operated with a high degree of efficiency, and the first piston can be operated with an accordingly high degree of efficiency.

According to the eighth mode of the invention, the damper member is interposed between the first and second pistons, and the first piston is held in abutting contact with the second piston via the damper member such that the first piston is rotatable relative to the second piston. The damper member reduces a risk of breakage and deformation of the first and second pistons due to an impact force generated upon direct abutting contact between the first and second pistons.

According to the ninth mode of the invention, the damper member is bonded to an axial end face of the second piston on the side of the first piston. This damper member, which has a simple structure bonded to the second piston, makes it possible to reduce the risk of breakage and deformation of the first and second pistons due to the impact force generated upon direct abutting contact between the first and second pistons.

According to the tenth mode of the invention, the hydraulic actuator includes a mechanically operated hydraulic pump or an electrically operated hydraulic pump to pressurize the working fluid in the oil chamber, for thereby axially moving the second piston in the direction toward the first piston. The hydraulic pressure of the pressurized working fluid can be regulated mechanically or electrically, which is functionally optimum for various design types of the vehicular power transmitting system.

According to the eleventh mode of the invention, the rotary shaft has the center bore in which the first piston and the axial end portion of the second piston are accommodated, and the lubricant is supplied into the center bore through the axial open end of the center bore on the side of the above-described other of the pair of support walls. Further, the clutch gear is mounted on the rotary shaft via the needle bearing such that the clutch gear is rotatable relative to the rotary shaft. The rotary shaft has the at least one radial oil passage formed so as to extend therethrough in its radial direction, so that the lubricant is delivered from the center bore to the needle bearing through the at least one radial oil passage. The lubricant supplied into the center bore of the rotary shaft permits reduction of amounts of wearing of the rotary shaft, clutch gear, first and second pistons, and other components of the vehicular power transmitting system, while the dog clutch is placed in its engaged state, for example.

According to the twelfth mode of the invention, the rotary shaft has the guide hole extending in its axial direction, for fluid-communication with the center bore, and the sleeve is connected to the first piston through the connecting member which extends through the guide hole and which is fixed to the first piston. Since the sleeve is connected to the first piston through the connecting member, the sleeve is reciprocated in the axial direction of the rotary shaft when the first piston is reciprocated.

According to the thirteenth mode of the invention, the first piston is located in the axially middle portion of the rotary shaft. Since the first piston with which the sleeve is reciprocated is disposed coaxially with the rotary shaft and located in the axially middle portion of the rotary shaft, the vehicular power transmitting system is applicable to a conventional MT type vehicle provided with the rotary shaft, for instance, without a need for complicated modification of components of the MT type vehicle (a vehicle with a manual transmission). Therefore, the vehicular power transmitting system can be simplified in construction and manufactured at a reduced cost.

According to the fourteenth mode of the invention, the first piston is located in an axial end portion of the rotary shaft which is on the side of the second piston. Since the first piston and the second piston with which the sleeve is reciprocated is disposed coaxially with the rotary shaft and located in the axial end portion of the rotary shaft on the side of the second piston, the vehicular power transmitting system is applicable to a conventional MT type vehicle provided with the rotary shaft, for instance, without a need for complicated modification of components of the MT type vehicle. In addition, the second piston can be reduced in size, so that the vehicular power transmitting system can be simplified in construction and manufactured at a reduced cost.

DETAILED DESCRIPTION OF A PREFERRED EMBODIMENT

Figure 1:
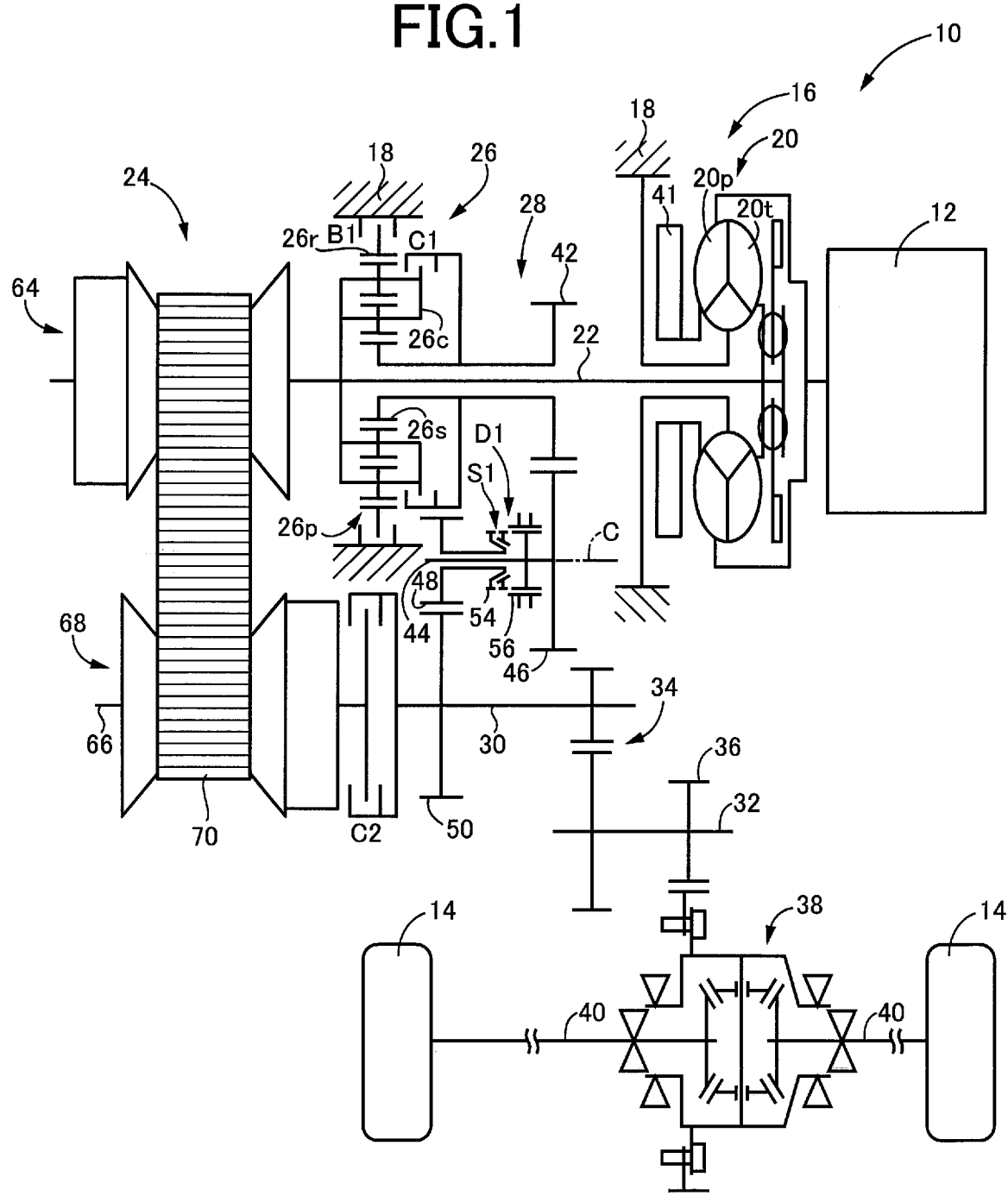
FIG. 1 is a schematic view showing an arrangement of a vehicle having a power transmitting system according to one embodiment of the present invention.

Referring to the drawings, a preferred embodiment of the present invention will be described in detail. It is to be understood that the drawings are simplified and transformed as needed, and do not necessarily accurately represent the dimensions and shapes of various elements of the embodiment.

First Embodiment

FIG. 1 is the schematic view showing an arrangement of a vehicle 10 having a power transmitting system 16 according to one embodiment of this invention. As shown in FIG. 1, the vehicle 10 is provided with a vehicle drive power source in the form of an engine 12, drive wheels 14, and the power transmitting system 16 disposed between the engine 12 and the drive wheels 14. The power transmitting system 16 includes, within a stationary member in the form of a housing 18: a fluid-operated power transmitting device in the form of a known torque converter 20 connected to the engine 12; an input shaft 22 connected to the torque converter 20; a continuously variable transmission mechanism in the form of a known belt-and-pulley-type continuously variable transmission 24 (hereinafter referred to as "continuously variable transmission 24") connected to the input shaft 22; a forward/reverse switching device 26 connected to the input shaft 22; a power transmitting mechanism in the form of a gear mechanism 28 connected to the input shaft 22 through the forward/reverse switching device 26 and disposed in parallel with the continuously variable transmission 24; an output shaft 30 which is an output rotary member of both of the continuously variable transmission 24 and the gear mechanism 28; a counter shaft 32; a speed reducing gear device 34 consisting of a pair of gears which mesh with each other and which are respectively rotated with the output shaft 30 and the counter shaft 32; a differential gear device 38 connected to the counter shaft 32 such that a differential gear 36 of the differential gear device 38 is rotated with the counter shaft 32; and a pair of axles 40 connected to the differential gear device 38. In the power transmission system 16 constructed as described above, a drive force, power or torque generated by the engine 12 is transmitted to the pair of drive wheels 14 through the torque converter 20, the continuously variable transmission 24 or the forward/reverse switching device 26 and the gear mechanism 28, the speed reducing gear device 34, the differential gear device 38, and the axles 40.

As described above, the power transmitting system 16 is provided with the continuously variable transmission 24 and the gear mechanism 28, which are disposed in parallel with each other, between the engine 12 (or the input shaft 22 which is an input rotary member receiving the drive force of the engine 12) and the drive wheels 14 (or the output shaft 30 which is an output rotary member from which the drive force of the engine 12 is transmitted to the drive wheels 14). Thus, the power transmitting system 16 has a first power transmitting path through which the drive force of the engine 12 is transmitted through the continuously variable transmission 24 from the input shaft 22 to the drive wheels 14 (that is, to the output shaft 30), and a second power transmitting path through which the drive force of the engine 12 is transmitted through the gear mechanism 28 from the input shaft 22 to the drive wheels 14 (that is, to the output shaft 30). In the power transmitting system 16, one of the first and second power transmitting paths is selectively placed in a power transmitting state depending upon a running state of the vehicle 10. The power transmitting system 16 is provided with clutches for selectively placing the first and second power transmitting paths in the power transmitting state. Namely, the power transmitting system 16 is provided with a first clutch in the form of a CVT drive clutch C2 for placing the first power transmitting path in the power transmitting state or a power cutoff state, and a second clutch in the form of a forward drive clutch C1 and a reverse drive brake B1 for placing the second power transmitting path in the power transmitting state or a power cutoff state. The CVT drive clutch C2, the forward drive clutch C1 and the reverse drive brake B1 are power connecting/disconnecting devices, each of which is a known hydraulically operated frictional coupling device (friction clutch) which is placed in an engaged state by a hydraulic actuator. The forward drive clutch C1 and the reverse drive brake B1 are elements of the forward/reverse switching device 26 which will be described in detail.

The torque converter 20 is disposed radially outwardly of, and coaxially with the input shaft 22, and is provided with a pump impeller 20*p* connected to the engine 12, and a turbine impeller 20*t* connected to the input shaft 22. A mechanically operated hydraulic pump 41 is connected to the pump impeller 20*p*, and is operated by a rotary motion of the pump impeller 20*p* driven by the engine 12, to generate a pressurized working oil used to change a speed ratio of the continuously variable transmission 24, to give a tension to a transmission belt 70 of the continuously variable transmission 24, to selectively place the above-described clutches C1 and C2 and brake B1 in their engaged and released states, and to lubricate various portions of the power transmitting system 16.

The forward/reverse switching device 26 is disposed in the above-described second power transmitting path, radially outwardly of, and coaxially with the input shaft 22, and is constituted principally by a planetary gear set 26*p* of a double-pinion type, the forward drive clutch C1 and the reverse drive brake B1. The planetary gear set 26*p* is a differential mechanism including three rotary elements, that is, an input rotary element in the form of a carrier 26*c*, an output rotary element in the form of a sun gear 26*s*, and a reaction rotary element in the form of a ring gear 26*r*. The carrier 26*c* is integrally connected to the input shaft 22, and the ring gear 26*r* is selectively fixed to the housing 18 through the reverse drive brake B1, while the sun gear 26*s* is fixed to a small-diameter gear 42 which is disposed radially outwardly of, and coaxially of the input shaft 22 such that the sun gear 26*s* is rotatable relative to the input shaft 22. The carrier 26*c* and the sun gear 26*s* are selectively connected to each other through the forward drive clutch C1. Namely, the forward drive clutch C1 functions as a clutch mechanism configured to selectively connect two rotary elements of the three rotary elements of the planetary gear set 26*p*, while the reverse drive brake B1 functions as a clutch mechanism configured to selectively fix the reaction rotary element of the planetary gear set 26*p* to the housing 18.

The continuously variable transmission 24 is disposed in a power transmitting path between the input shaft 22 and the output shaft 30. The continuously variable transmission 24 is provided with a primary pulley 64 fixedly mounted on the input shaft 22, a secondary pulley 68 fixedly mounted on a rotary shaft 66 disposed coaxially with the output shaft 30, and the above-indicated transmission belt 70 connecting the primary and secondary pulleys 64 and 68. A drive force is transmitted between the primary and secondary pulleys 64 and 66 through forces of friction between the transmission belt 70 and the pulleys 64 and 68. An effective diameter of each of the pulleys 64 and 68, which is defined by widths of V-grooves of the pulleys 64 and 68 for engagement with the transmission belt 70, is variable so that a speed ratio (gear ratio) γ of the continuously variable transmission 24 (=an input shaft speed Ni/an output shaft speed No) is variable. The CVT drive clutch C2 is disposed on one of opposite sides of the continuously variable transmission 24 which is on the side of the drive wheels 14, that is, disposed between the secondary pulley 68 and the output shaft 30, to selectively connect and disconnect the secondary pulley 68 (rotary shaft 66) and the output shaft 30 to and from each other. In the power transmitting system 16, a power transmitting path is established in the above-described first power transmitting path, to transmit the drive force of the engine 12 to the output shaft 30 through the input shaft 22 and the continuously variable transmission 24 when the CVT drive clutch C2 is placed in the engaged state. In the power transmitting system 16, the first power transmitting path is placed in a neutral state (power cutoff state) when the CVT drive clutch C2 is placed in the released state.

The gear mechanism 28 is provided with the small-diameter gear 42, and a large-diameter gear 46 meshing with the small-diameter gear 42. The large-diameter gear 46 is mounted on a rotary shaft 44 rotatable about its axis, namely, a gear mechanism counter shaft 44, such that the large-diameter gear 46 is rotated with the gear mechanism counter shaft 44 about its axis C1. The gear mechanism 28 is further provided with an idler gear 48 coaxially mounted on the gear mechanism counter shaft 44 such that the idler gear 48 is rotatable relative to the gear mechanism counter shaft 44, and an output gear 50 coaxially mounted on the output shaft 30 such that the output gear 50 is rotated with the output shaft 30. The output gear 50 is held in meshing engagement with the idler gear 48, and has a larger diameter than the idler gear 48. Thus, the gear mechanism 28 is a power transmitting mechanism which is disposed between the input shaft 22 and the output shaft 30 and which has a predetermined gear ratio. A dog clutch D1 having a synchro-mesh mechanism (hereinafter referred to as "dog clutch D1") is disposed coaxially with the gear mechanism counter shaft 44, and between the large-diameter gear 46 and the idler gear 48 in the axial direction of the gear mechanism counter shaft 44, to selectively connect and disconnect the large-diameter gear 46 and the idler gear 48 to and from each other. The dog clutch D1 is a dog type clutch which is provided in the power transmitting system 16 (disposed in a power transmitting path between the engine 12 and the drive wheels 14), to selectively place a power transmitting path between the sun gear 26s and the output shaft 30, in a power transmitting state and a power cutoff state. The dog clutch D1 functions as a third clutch which is disposed between the forward drive clutch C1 and the output shaft 30, to selectively place the above-described second power transmitting path in the power transmitting or cutoff state.

Figure 2:
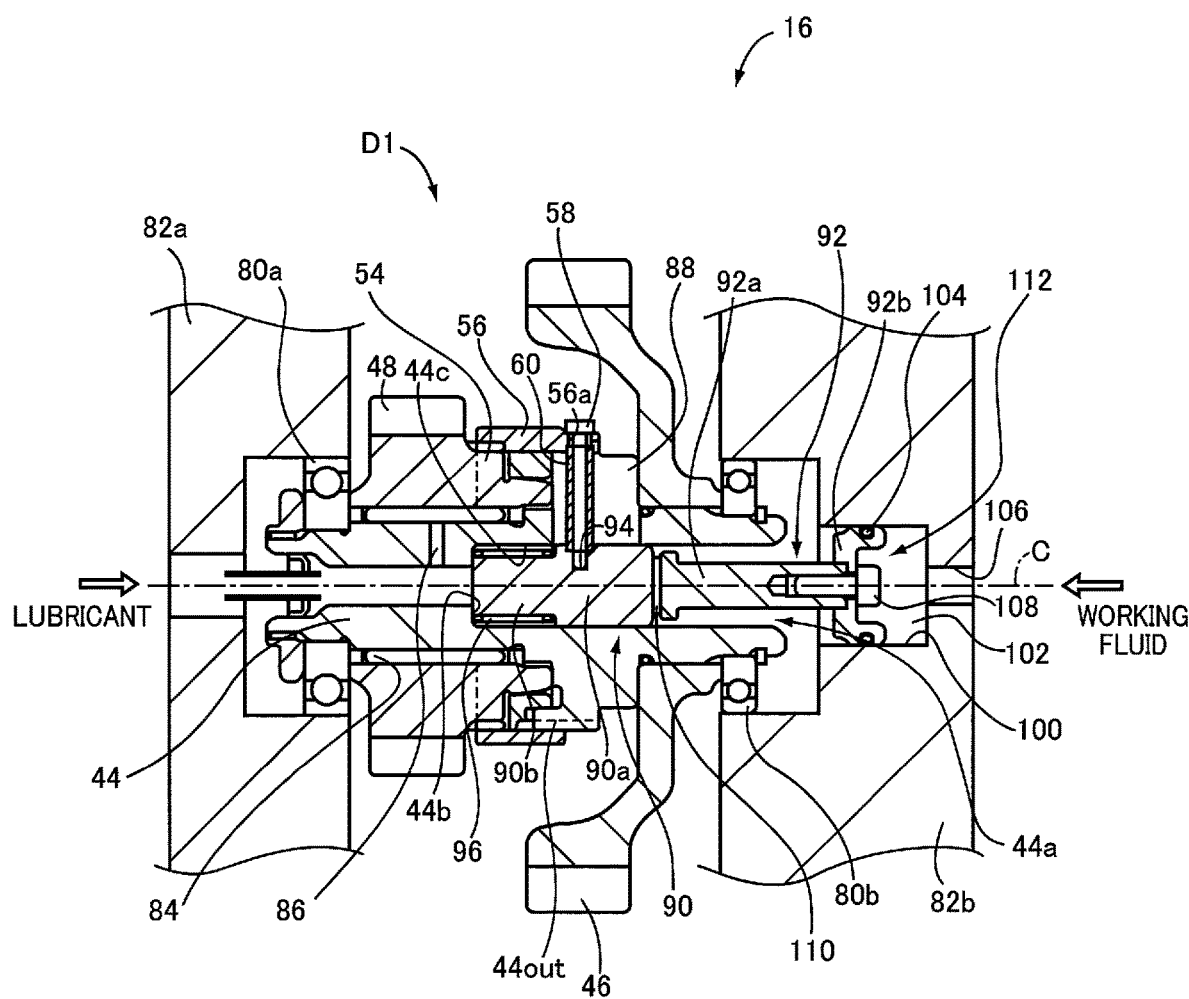
FIG. 2 is a view showing the power transmitting system when a dog clutch having a synchro-mesh mechanism shown in FIG. 1 is placed in its engaged state.

FIG. 2 is the view showing the power transmitting system 16 when the dog clutch D1 shown in FIG. 1 is placed in its engaged state. As shown in FIG. 2, the gear mechanism counter shaft 44 is supported rotatably about its axis C, by a pair of support walls 82a and 82b via respective bearings 80a and 80b. The gear mechanism counter shaft 44 has a center bore 44a having the axis C, and is lubricated with a lubricant supplied into the center bore 44a through one of its opposite axial open ends on the side of the support wall 82a, while the gear mechanism counter shaft 44 is supported by the pair of support walls 82a and 82b.

Described more specifically by reference to FIG. 2, the dog clutch D1 includes a clutch gear 54 which is fixed to or integrally formed with an axial end portion of the idler gear 48 on the side of the large-diameter gear 46, coaxially with the gear mechanism counter shaft 44, such that the clutch gear 54 is rotatable relative to the gear mechanism counter shaft 44. This clutch gear 54 functions as one of a pair of mutually meshing gears of the dog clutch D1. The dog clutch D1 further includes a sleeve 56 fixed to a first piston 90 with a fixing member in the form of a connecting pin 58. The first piston 90 is disposed within the center bore 44a of the gear mechanism counter shaft 44. The sleeve 56 has internal teeth 56s (described below) meshing with external teeth 44out of the gear mechanism counter shaft 44. The sleeve 56 is mounted on the gear mechanism counter shaft 44 such that the sleeve 56 is rotated with the gear mechanism counter shaft 44 about the axis C and is movable relative to the gear mechanism counter shaft 44 in the direction of the axis C. The internal teeth 56s of the sleeve 56 which are engageable with the clutch gear 54 for meshing with the clutch gear 54 function as the other of the above-indicated pair of mutually meshing gears of the dog clutch D1. The dog clutch D1 further includes a needle bearing 84 interposed between the gear mechanism counter shaft 44, and the clutch gear 54 and idler gear 48 in its radial direction, so that the clutch gear 54 and the idler gear 48 are supported by or mounted on the gear mechanism counter shaft 44 via the needle bearing 84, such that the clutch gear 54 and the idler gear 48 are rotatable relative to the gear mechanism counter shaft 44. The gear mechanism counter shaft 44 has radial oil passages 86 formed so as to extend therethrough in its radial direction, so that the lubricant supplied into the center bore 44a through its axial open end on the side of the support wall 82a is delivered from the center bore 44a to the needle bearing 84 through the radial oil passages 86.

Figure 3:
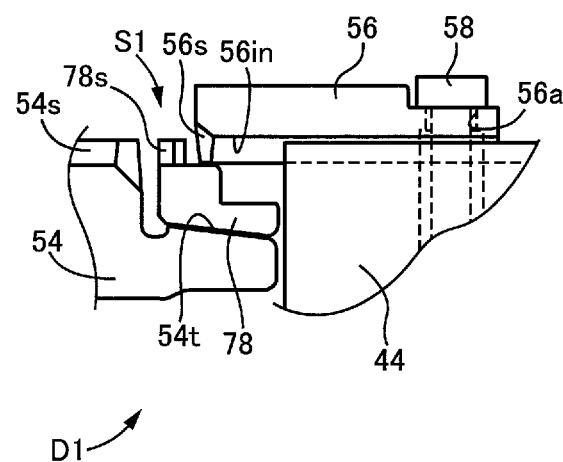
FIG. 3 is an enlarged view of a part of the dog clutch having the synchro-mesh mechanism of FIG. 2.

FIG. 3 is the enlarged view of a part of the dog clutch D1. As shown in FIG. 3, the dog clutch D1 has a synchronizing mechanism in the form of a known synchro-mesh mechanism S1 for synchronizing speeds of rotary motions of the sleeve 56 and the clutch gear 54 upon their meshing engagement with each other. FIG. 3 shows the dog clutch D1 placed in its released state in which the second power transmitting path is placed in the power cutoff state, more specifically, while the internal teeth 56s formed in an inner circumferential surface 56in of the sleeve 56 are not held in meshing engagement with external teeth 54s of the clutch gear 54. The synchro-mesh mechanism S1 has a synchronizer ring 78, and the clutch gear 54 has a tapered outer circumferential surface 54t which is provided for sliding contact with the synchronizer ring 78 and an outside diameter of which decreases in the axial direction from the idler gear 48 toward the large-diameter gear 46, after the gear mechanism 28 is assembled in position. The synchronizer ring 78 is supported in sliding contact with the tapered outer circumferential surface 54t such that the synchronizer ring 78 is rotatable relative to the gear mechanism counter shaft 44. When the sleeve 56 is axially moved from its position of FIG. 3 toward the clutch gear 54, the internal teeth 56s of the sleeve 56 come into abutting contact with external teeth 78s of the synchronizer ring 78 of the synchro-mesh mechanism S1, so that the axial movement of the sleeve 56 is prevented by the abutting contact, whereby the synchronization of the rotary motions of the sleeve 56 and the clutch gear 54 with each other is initiated. As a result of the synchronization of the rotary motions of the sleeve 56 and the clutch gear 54, the internal teeth 56s of the sleeve 56 are brought into meshing engagement with the external teeth 54s of the clutch gear 54 via the external teeth 78s of the synchronizer ring 78. As a result of the meshing engagement of the internal teeth 56s of the sleeve 56 with the external teeth 54s of the clutch gear 54, the dog clutch D1 is brought into its engaged state, so that the above-described second power transmitting path is switched from its power cutoff state to its power transmitting state. As shown in FIGS. 2 and 3, the sleeve 56 has a radial hole 56a through which the connecting pin 58 and a bushing 60 extend. The connecting pin 58 extends through the bushing 60.

As shown in FIG. 2, the first piston 90 has a first cylindrical portion 90a, and the gear mechanism counter shaft 44 has a guide hole 88 in which the connecting pin 58 and the bushing 60 fixed to the first cylindrical portion 90a so as to extend in its radial direction are permitted to move in the direction of the axis C. The guide hole 88 is open in the outer circumferential surface of the gear mechanism counter shaft 44, and is formed so as to extend in the radial direction of the gear mechanism counter shaft 44, for communication with the center bore 44a, but does not extend through an entire diameter of the gear mechanism counter shaft 44. The guide hole 88 has a dimension in the direction of the axis C. The connecting pin 58 extending through the guide hole 88 together with the bushing 60 is fixed at its head portion to the sleeve 56, so that the sleeve 56 is reciprocated together with the first cylindrical portion 90*a* of the first piston 90.

In the dog clutch D1, the first piston 90 is axially reciprocated by a second piston 92 and a coil spring 96 (described below), so that the sleeve 56 fixed to the first piston 90 is reciprocated (advanced and retracted) in the direction of the axis C of the gear mechanism counter shaft 44, whereby the dog clutch D1 is switched between its released and engaged states. In the vehicular power transmitting system 16, the second power transmitting path is placed in the power transmitting state for transmitting the drive force of the engine 12 from the input shaft 22 to the output shaft 30 through the gear mechanism 28 to drive the vehicle 10 in the forward or reverse direction, when the dog clutch D1 and the forward drive clutch C1 or the reverse drive brake B1 are both placed in their engaged states. On the other hand, the second power transmitting path is placed in the power cutoff or neutral state, when the forward drive clutch C1 and the reverse drive brake B1 are both placed in their released states, or when at least the dog clutch D1 is placed in its released state.

As shown in FIG. 2, the first piston 90 and an axial end portion of the second piston 92 adjacent to the first piston 90 are accommodated within the center bore 44*a* which is formed through the gear mechanism counter shaft 44 and which has different diameters. The first and second pistons 90 and 92 are disposed coaxially with the gear mechanism counter shaft 44. As shown in FIG. 2, the first piston 90 is located in an axially intermediate or middle portion of the center bore 44*a*, that is, in an axially intermediate or middle portion of the gear mechanism counter shaft 44. The first piston 90 is a stepped solid cylindrical member consisting of the first cylindrical portion 90*a*, and a second cylindrical portion 90*b* having a smaller diameter than the first cylindrical portion 90*a*. The first cylindrical portion 90*a* is located on the side of the second piston 92 while the second cylindrical portion 90*b* is located on one side of the first cylindrical portion 90*a* remote from the second piston 92. One of opposite axial end faces of the first piston 90 which is remote from the second piston 92, that is, an axial end face of the second cylindrical portion 90*b* is abuttable on a shoulder surface 44*b* of the gear mechanism counter shaft 44 perpendicular to the axis C, which is a surface of a shoulder of the gear mechanism counter shaft 44 that partly defines the center bore 44*a*. The first cylindrical portion 90*a* has a fixing hole 94 formed in its radial direction so as to be open in its outer circumferential surface, and each of the connecting pin 58 and the bushing 60 is fixed at its axial end portion in the fixing hole 94, by press fitting, for example, so that the first piston 90 and the sleeve 56 are connected or fastened to each other with the connecting pin 58 and the bushing 60. While the connecting pin 58 is used as a connecting member for connecting the first piston 90 and the sleeve 56 in the present embodiment, a connecting screw may be used as the connecting member, for instance. In this instance, the first cylindrical portion 90*a* has a tapped hole formed in its outer circumferential surface.

An elastic member in the form of the above-indicated coil spring 96 is disposed radially outwardly of the second cylindrical portion 90*b*. Described more specifically, the coil spring 96 is accommodated in a space formed between the second cylindrical portion 90*b* and an inner circumferential surface 44*c* of the gear mechanism counter shaft 44 which partly defines the center bore 44*a*, namely, in a cylindrical space defined by the outer circumferential surface of the second cylindrical portion 90*b*, the shoulder surface 44*b*, and the inner circumferential surface 44*c* of the gear mechanism counter shaft 44. The coil spring 96 is disposed coaxially with the first piston 90, that is, coaxially with the gear mechanism counter shaft 44. The first piston 90 is axially moved with a biasing force of the coil spring 96 in a direction away from the clutch gear 54 while the first piston 90 is not axially advanced by the second piston 92 in a direction toward the clutch gear 54, namely, in the leftward direction as seen in FIG. 2. Described in more detail, the first piston 90 is held apart from the shoulder surface 44*b* under a biasing action of the coil spring 92 while a hydraulic pressure of a pressurized working fluid described below is not applied to the second piston 92 and thus the piston is not driven toward the clutch gear 54, that is, while an oil chamber 102 which is formed in the support wall 82*b* and in which an axial end portion of the second piston 92 remote from the first piston 90 is slidably fitted is not charged with the pressurized working fluid. In this respect, it is noted that the oil chamber 102 and the second piston 92 function as a hydraulic actuator 112.

As shown in FIG. 2, The second piston 92 consists of a cylindrical main body portion 92*a*, and a collar portion 92*b* which is a generally disc-like member. An axial end portion of the second piston 92 on the side of the first piston 90, that is, an axial end section of the main body portion 92*a* on the side of the first piston 90 is accommodated within the center bore 44*a*, while the other axial end portion of the second piston 92, that is, the collar portion 92*b* is accommodated within the support wall 82*b* such that the collar portion 92*b* cooperates with the support wall 82*b* to define the oil chamber 102. Described more specifically, the collar portion 92*b*, which is a member separate from the main body portion 92*a*, is slidably and oil-tightly fitted in a piston fitting hole 100 formed in the support wall 82*b* coaxially with the second piston 92, such that the collar portion 92*b* and the piston fitting hole 100 cooperate to define the oil chamber 102. The collar portion 92*b* is provided with a sealing member in the form of an O-ring 104, for example. The oil chamber 102 is a cylindrical space formed coaxially with the gear mechanism counter shaft 44 having the axis C, and is held in fluid communication with an oil passage 106 formed through the support wall 82*b*, so that the working fluid the hydraulic pressure of which is regulated is fed into the oil chamber 102 through the oil passage 106. When the pressurized working fluid is fed into the oil chamber 102, the second piston 92 is axially moved or advanced toward the first piston 90, for abutting contact with the first piston 90 such that the first piston 90 is rotatable relative to the second piston 92. A damper member 110 is integrally bonded with an adhesive to an axial end face of the main body portion 92*a* of the second piston 92, which is on the side of the first piston 90. For instance, the damper member 110 takes the form of a disc. One of opposite surfaces of the damper member 110 remote from the above-indicated axial end face of the main body portion 92*a* is abuttable on an axial end face of the first piston 90, which is on the side of the second piston 92. The collar portion 92*b* is fixed to the main body portion 92*a* with a fixing member in the form of a fixing screw 108, for instance. While the working fluid is pressurized by the mechanically operated hydraulic pump 41 in this embodiment, the working fluid may be prepared electrically, for instance.

In the present embodiment, the dog clutch D1 is switched from its released state to its engaged state by applying a thrust force to the first piston 90 via the second piston 92, to axially move the sleeve 56 for bringing its internal teeth 56*s* into meshing engagement with the external teeth 54*s* of the clutch gear 54 through the external teeth 78s of the synchronizer ring 78. Described more specifically, the thrust force is applied to the first piston 90 via the second piston 92 by mechanical means, namely, by abutting contact of the second piston 92 with the first piston 90 with an axial movement of the second piston 92 with the hydraulic pressure of the pressurized working fluid fed into the oil chamber 102, without application of the hydraulic pressure directly to the first piston 90. Since the first piston 90 is driven by the mechanical means without direct application of the hydraulic pressure thereto, the first piston 90 is not required to be provided with any oil sealing member, and the center bore 44a and the first piston 90 are not required to be formed with high degrees of accuracy of their diametric dimensions in order to avoid a problem of so-called "sticking" of the first piston 90 within the center bore 44a, which would take place when the gear mechanism counter shaft 44 is deformed due to a load received from the associated gears. In addition, an oil passage for applying the hydraulic pressure of the pressurized working fluid directly to the first piston 90 is not required, and the first piston 90 does not suffer from a problem of sliding loss due to the provision of the above-indicated oil sealing member. The first piston 90 is advanced with the axial movement of the second piston 92 for abutting contact with the first piston 90, and is returned or retracted back to the original position with the biasing force of the coil spring 96. Namely, the present embodiment is configured to reciprocate the first piston 90 in the direction of the axis C, with the mechanical means.

The vehicular power transmitting system 16 according to the present first embodiment of the invention described above comprises the first piston 90 disposed within the rotary shaft in the form of the gear mechanism counter shaft 44, and the sleeve 56 connected to the first piston 90 and reciprocable together with the first piston 90 in the direction of the axis C of the gear mechanism counter shaft 44, according to axial movements of the first piston 90. The sleeve 56 has the internal teeth 56s meshing with the external teeth 44out of the gear mechanism counter shaft 44 so that the sleeve 56 is rotated with the gear mechanism counter shaft 44. The vehicular power transmitting system 16 further comprises the synchronizer ring 78 supported in sliding contact with the tapered outer circumferential surface 54t of the clutch gear 54 such that the synchronizer ring 78 is rotatable relative to the clutch gear 54, and the hydraulic actuator 112 including the second piston 92 to axially reciprocate the first piston 90 for thereby bringing the internal teeth 56s of the sleeve 56 into meshing engagement with the clutch gear 54 through the synchronizer ring 78. Further, the first piston 90 and the second piston 92 are disposed coaxially with the gear mechanism counter shaft 44. Thus, the dog clutch D1 is switched from the released state to the engaged state with an axial movement of the sleeve 56 with a thrust force which is applied to the first piston 90 disposed within and coaxially with the gear mechanism counter shaft 44, by an axial movement of the second piston 92 also disposed coaxially with the gear mechanism counter shaft 44. Namely, the thrust force is applied to the sleeve 56 through the first and second pistons 90 and disposed coaxially with the gear mechanism counter shaft 44. Accordingly, the first piston 90 coaxial with the gear mechanism counter shaft 44 is less likely to be subjected to a bending force than where the first piston 90 receives the thrust force at a point not on the axis C of the gear mechanism counter shaft 44, for example, at a point spaced apart from the axis C in the radial direction of the gear mechanism counter shaft 44. Therefore, the first piston 90 is not required to be provided with an oil sealing member, and is operable with a high degree of stability, so that the dog clutch D1 has an increased degree of operational reliability.

The vehicular power transmitting system 16 of the present embodiment further comprises the elastic member in the form of the coil spring 96 disposed in the space between the outer circumferential surface of the first piston 90 and the inner circumferential surface 44c of the gear mechanism counter shaft 44 to bias the first piston 90 in the axial direction for disengagement of the internal teeth 56s of the sleeve 56 from the clutch gear 54. Accordingly, the first piston 90 can be moved by the biasing force of the coil spring 96 with the sleeve 56, in the axial direction for disengagement of the internal teeth 56s of the sleeve 56 from the clutch gear 54.

The present embodiment is further configured such that the coil spring 96 is disposed coaxially with the first piston 90. Accordingly, the first piston 90 can be efficiently moved with the biasing force of the coil spring 96 in the direction for disengagement of the internal teeth 56s of the sleeve 56 from the clutch gear 54.

The present embodiment is also configured such that the first piston 90 is axially retracted in the direction away from the clutch gear 54 with the biasing force of the coil spring 96 while the first piston 90 is not axially advanced by the second piston 92. Since the first piston 90 can be retracted in the direction away from the clutch gear 54 with the biasing force of the coil spring 96, the vehicular power transmitting system 16 need not be configured to apply a hydraulic pressure of the pressurized working fluid to the first piston 90 to retract the first piston 90 in the direction away from the clutch gear 54. Accordingly, the vehicular power transmitting system 16 is not required to be provided with a solenoid-operated valve for applying the hydraulic pressure of the pressurized working fluid to the first piston 90, so that the number of components of the vehicular power transmitting system 16 can be reduced, with a result of reduction of its cost of manufacture.

The present embodiment is further configured such that the gear mechanism counter shaft 44 is supported rotatably by the pair of support walls 82a and 82b via the pair of bearings 80a and 80b, and the second piston 92 is at least partly accommodated within the support wall 82b. Since the second piston 92 for axially advancing the first piston 90 is at least partly accommodated within the support wall 80b separate from the gear mechanism counter shaft 44, the gear mechanism counter shaft 44 need not be provided with an accurately formed portion for accommodating the second piston 92, and a sealing member having a high degree of sealing function. Accordingly, the cost of manufacture of the gear mechanism counter shaft 44 can be reduced.

The present embodiment is further configured such that the hydraulic actuator 112 has the piston fitting hole 100 which is formed in the support wall 82b of the pair of support walls 82a and 82b coaxially with the second piston 92 and in which the second piston 92 is slidably and oil-tightly fitted, and the second piston 92 and the piston fitting hole 100 cooperate to define the oil chamber 102. When the dog clutch D1 is brought into its engaged state, the pressurized working fluid is fed into the oil chamber 102 to axially move the second piston 92 for axially advancing the first piston 90 to which the sleeve 56 is connected. Accordingly, it is not necessary to apply the hydraulic pressure of the pressurized working fluid directly to the first piston 90, whereby it is not necessary to provide the first piston 90 with an oil sealing member, and not necessary to form an oil passage through which the pressurized working fluid is fed to axially advance the first piston 90. Accordingly, the cost of manufacture of the vehicular power transmitting system 16 can be reduced. In addition, elimination of a need of providing the first piston 90 with the oil sealing member makes it possible to reduce a risk of generation of a problem of sliding loss of the first piston 90 due to the provision of the oil sealing member, whereby power transmitting efficient of the vehicular power transmitting system 16 can be improved.

The present embodiment is further configured such that the oil chamber 102 is the cylindrical space formed coaxially with the gear mechanism counter shaft 44. Since the oil chamber 102 is formed as the cylindrical space coaxial with the gear mechanism counter shaft 44, that is, coaxially with the first and second pistons 90 and 92, a loss of hydraulic pressure of the pressurized working fluid to be fed into the oil chamber 102 can be made smaller than where the oil chamber 102 was not coaxial with the first and second pistons 90 and 92. Accordingly, the second piston 92 can be operated with a high degree of efficiency, and the first piston 90 can be operated with an accordingly high degree of efficiency.

The present embodiment is further configured such that the damper member 110 is interposed between the first and second pistons 90 and 92, and the first piston 90 is held in abutting contact with the second piston 92 via the damper member 110 such that the first piston 90 is rotatable relative to the second piston 92. The damper member 110 reduces a risk of breakage and deformation of the first and second pistons 90 and 92 due to an impact force generated upon direct abutting contact between the first and second pistons 90 and 92.

The present embodiment is further configured such that the damper member 110 is bonded to an axial end face of the second piston 92 on the side of the first piston 90. This damper member 110, which has a simple structure bonded to the second piston 92, makes it possible to reduce the risk of breakage and deformation of the first and second pistons 90 and 92 due to the impact force generated upon direct abutting contact between the first and second pistons 90 and 92.

The present embodiment is further configured such that the hydraulic actuator 112 includes the mechanically operated hydraulic pump 41 to pressurize the working fluid in the oil chamber 102, for thereby axially moving the second piston 92 in the direction toward the first piston 90. The hydraulic pressure of the pressurized working fluid can be regulated mechanically or electrically, which is functionally optimum for various design types of the vehicular power transmitting system 16.

The present embodiment is further configured such that the gear mechanism counter shaft 44 has the center bore 44a in which the first piston 90 and the axial end portion of the second piston 92 adjacent to the first piston 90 are accommodated, and the lubricant is supplied into the center bore 44a through the axial open end of the center bore 44a on the side of the support wall 82a. Further, the clutch gear 54 is mounted on the gear mechanism counter shaft 44 via the needle bearing 84 such that the clutch gear 54 is rotatable relative to the gear mechanism counter shaft 44. The gear mechanism counter shaft 44 has the radial oil passages 86 formed so as to extend therethrough in its radial direction, so that the lubricant is delivered from the center bore 44a to the needle bearing 84 through the radial oil passages 86. The lubricant supplied into the center bore 44a of the gear mechanism counter shaft 44 permits reduction of amounts of wearing of the gear mechanism counter shaft 44, clutch gear 54, first and second pistons 90 and 92, and other components of the vehicular power transmitting system 16, while the dog clutch D1 is placed in its engaged state, for example.

The present embodiment is further configured such that the gear mechanism counter shaft 44 has the guide hole 88 extending in its axial direction, for fluid-communication with the center bore 44a, and the sleeve 56 is connected to the first piston 90 through the connecting member in the form of the connecting pin 58 which extends through the guide hole 88 and which is fixed to the first piston 90. Since the sleeve 56 is connected to the first piston 90 through the connecting pin 58, the sleeve 56 is reciprocated in the direction of the axis C of the gear mechanism counter shaft 44 when the first piston 90 is reciprocated.

The present embodiment is further configured such that the first piston 90 is located in the axially middle portion of the gear mechanism counter shaft 44. Since the first piston 90 with which the sleeve 56 is reciprocated is disposed coaxially with the gear mechanism counter shaft 44 and located in the axially middle portion of the gear mechanism counter shaft 44, the vehicular power transmitting system 16 is applicable to a conventional MT type vehicle provided with the gear mechanism counter shaft 44, for instance, without a need for complicated modification of components of the MT type vehicle. Therefore, the vehicular power transmitting system 16 can be simplified in construction and manufactured at a reduced cost.

Second Embodiment

Then, another embodiment of this invention will be described. It is to be understood that the same reference signs as used in the first embodiment will be used to in the following embodiment, to identify the corresponding elements, which will not be described redundantly.

Figure 4:
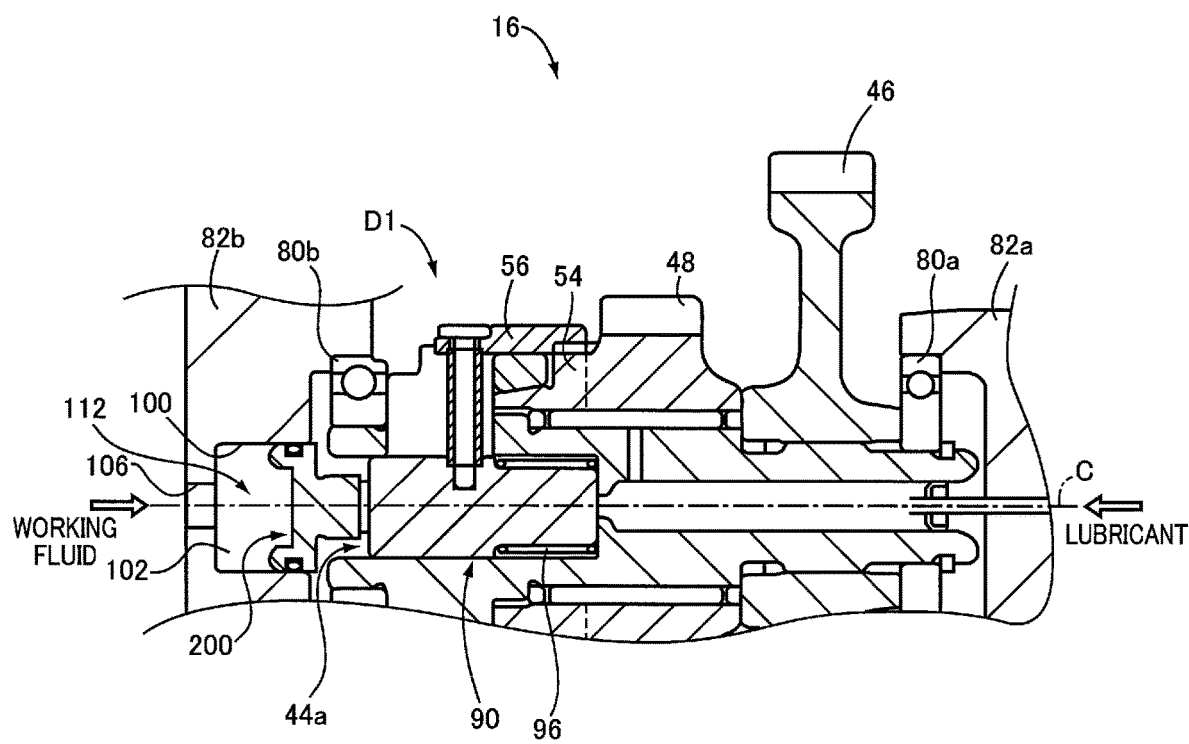
FIG. 4 is a schematic view showing an arrangement of a vehicular power transmitting system according to another embodiment of this invention, when a dog clutch having a synchro-mesh mechanism is placed in its engaged state.

FIG. 4 is the schematic view showing an arrangement of the vehicular power transmitting system 16 according to another embodiment of this invention, when the dog clutch D1 having the synchro-mesh mechanism is placed in its engaged state. In the present second embodiment, the first piston 90, and an axial end portion of a second piston 200 which is on the side of the first piston 90, are accommodated within the center bore 44a formed in the gear mechanism counter shaft 44, such that the first piston 90 and the second piston 200 are disposed coaxially with the gear mechanism counter shaft 44 having the axis C. The first piston 90 is located in an axial end portion of the center bore 44a, which is on the side of the support wall 82b, namely, on the side of the second piston 200, such that the first piston 90 is reciprocable in the direction of the axis C of the gear mechanism counter shaft 44. The second piston 200 is slidably and oil-tightly fitted in the piston fitting hole 100 formed in the support wall 82b, and cooperates with the piston fitting hole 100 to define the oil chamber 102, which cooperates with the second piston 200 to define the hydraulic actuator 112. In the dog clutch D1, the first piston 90 is advanced by the second piston 200 with the pressurized working fluid fed into the oil chamber 102, so that the sleeve 56 connected to the first piston 90 is advanced in the direction of the axis C, whereby the dog clutch D1 is switched from its released state to its engaged state. In the present second embodiment wherein the first piston 90 is disposed in the axial end portion of the center bore 44a on the side of the support wall 82b, the axial dimension of the second piston 200 can be made smaller than that of the second piston 92 in the first embodiment, so that the dog clutch D1 has a comparatively small axial dimension.

In the present second embodiment described above, the first piston 90 is located in an axial end portion of the gear mechanism counter shaft 44 which is on the side of the second piston 200. Since the first piston 90 with which the sleeve 56 is reciprocated is disposed coaxially with the gear mechanism counter shaft 44 and located in the above-indicated axial end portion of the gear mechanism counter shaft 44, the vehicular power transmitting system 16 is applicable to a conventional MT type vehicle provided with the gear mechanism counter shaft 44, for instance, without a need for complicated modification of components of the MT type vehicle. In addition, the second piston 200 can be reduced in size, so that the vehicular power transmitting system 16 can be simplified in construction and manufactured at a reduced cost.

While the preferred embodiments of the present invention have been described in detail by reference to the drawings, it is to be understood that the invention may be otherwise embodied.

In the illustrated first embodiment, the second piston 92 is disposed so as to be partly located within the support wall 82*b* of the pair of support walls 82*a* and 82*b*. However, this arrangement is not essential, provided that the gear mechanism counter shaft 44 extends between two support members.

In the illustrated embodiments, the coil spring 96 is used as an elastic member a biasing force of which acts on the first piston 90 to return the first piston 90 back to its original position. However, the coil spring 96 may be replaced by any other elastic member, such as a mechanism configured to move the first piston 90 to its original position by adding force thereon.

In the illustrated embodiments, the hydraulic actuator 112 is used to move the second piston. However, the hydraulic actuator 112 may be replaced by an electrically operated actuator including an electric motor which is operated to rotate a pinion which is held in engagement with a rack member corresponding to the second piston.

While the preferred embodiments of the present invention and its modifications have been described for illustrative purpose only, it is to be understood that the invention may be embodied with various other changes and improvements which may occur to those skilled in the art.

NOMENCLATURE OF REFERENCE SIGNS

16: Power transmitting system of a vehicle
44: Gear mechanism counter shaft (Rotary shaft)
44*a*: Center bore
44*out*: External teeth of gear mechanism counter shaft
54: Clutch gear (One of pair of meshing gears)
54*t*: Tapered outer circumferential surface
56: Sleeve
56*s*: Internal teeth of sleeve (the other of pair of meshing gears)
58: Connecting pin
78: Synchronizer ring
80*a*, 80*b*: Pair of bearings
82*a*, 82*b*: Pair of support walls
84: Needle bearing
86: Radial oil passages
88: Guide hole
90: First piston
92: Second piston
96: Coil spring (Elastic member)
100: Piston fitting hole
102: Oil chamber
110: Damper member
112: Hydraulic actuator (Actuator)
D1: Dog clutch having a synchro-mesh mechanism
C: Axis

What is claimed is:

1. A vehicular power transmitting system including a dog clutch having a synchro-mesh mechanism, which dog clutch is provided to selectively connect and disconnect a rotary shaft having external teeth, and a clutch gear rotatable relative to the rotary shaft, to and from each other, the clutch gear having a tapered outer circumferential surface, the vehicular power transmitting system comprising:
   a first piston disposed within a center bore formed through the rotary shaft such that the first piston is axially reciprocable;
   a sleeve connected to the first piston and having internal teeth meshing with the external teeth of the rotary shaft so that the sleeve is rotated with the rotary shaft, and such that the sleeve is axially reciprocable together with the first piston according to axial movements of the first piston;
   a synchronizer ring supported in sliding contact with the tapered outer circumferential surface of the clutch gear such that the synchronizer ring is rotatable relative to the clutch gear; and
   an actuator including a second piston to axially advance the first piston for thereby bringing the internal teeth of the sleeve into meshing engagement with the clutch gear through the synchronizer ring,
   and wherein the first piston and the second piston are disposed coaxially with the rotary shaft.

2. The vehicular power transmitting system according to claim 1, further comprising an elastic member disposed between an outer circumferential surface of the first piston and an inner circumferential surface of the rotary shaft to bias the first piston in a direction for disengagement of the internal teeth of the sleeve from the clutch gear.

3. The vehicular power transmitting system according to claim 2, wherein the elastic member is a coil spring disposed coaxially with the first piston.

4. The vehicular power transmitting system according to claim 2, wherein the first piston is axially retracted in a direction away from the clutch gear with a biasing force of the elastic member while the first piston is not axially advanced by the second piston.

5. The vehicular power transmitting system according to claim 1, wherein the rotary shaft is supported by a pair of support walls via a pair of bearings, and the second piston is at least partly accommodated within one of the pair of support walls.

6. The vehicular power transmitting system according to claim 5, wherein the actuator is a hydraulic actuator having a piston fitting hole which is formed in said one of the pair of support walls coaxially with the second piston and in which the second piston is slidably and oil-tightly fitted, the second piston and the piston fitting hole cooperating to define an oil chamber.

7. The vehicular power transmitting system according to claim 6, wherein the oil chamber is a cylindrical space formed coaxially with the rotary shaft.

8. The power transmitting system according to claim 6, wherein the hydraulic actuator includes a mechanically operated hydraulic pump or an electrically operated hydraulic pump to pressurize a working fluid in the oil chamber, for thereby axially moving the second piston in a direction toward the first piston.

9. The vehicular power transmitting system according to claim 5, wherein the rotary shaft has a center bore in which the first piston and an axial end portion of the second piston are accommodated, and a lubricant is supplied into the center bore through one of opposite axial open ends of the center bore which is on the side of the other of the pair of support walls, the clutch gear being mounted on the rotary shaft via a needle bearing such that the clutch gear is rotatable relative to the rotary shaft, the rotary shaft having at least one radial oil passage formed so as to extend therethrough in its radial direction, so that the lubricant is delivered from the center bore to the needle bearing through the at least one radial oil passage.

10. The vehicular power transmitting system according to claim 9, wherein the rotary shaft has a guide hole extending in its axial direction, for fluid-communication with the center bore, and the sleeve is connected to the first piston through a connecting member which extends through the guide hole and which is fixed to the first piston.

11. The vehicular power transmitting system according to claim 1, wherein a damper member is interposed between the first and second pistons, and the first piston is held in abutting contact with the second piston via the damper member such that the first piston is rotatable relative to the second piston.

12. The vehicular power transmitting system according to claim 11, wherein the damper member is bonded to an axial end face of the second piston on the side of the first piston.

13. The vehicular power transmitting system according to claim 1, wherein the first piston is located in an axially middle portion of the rotary shaft.

14. The vehicular power transmitting system according to claim 1, wherein the first piston is located in an axial end portion of the rotary shaft which is on the side of the second piston.

* * * * *